US005851331A

United States Patent [19]

Grenetier et al.

[11] Patent Number: 5,851,331

[45] Date of Patent: Dec. 22, 1998

[54] PROCESS FOR DECORATING A COMPOSITE ARTICLE SUCH AS A SKI, SNOWBOARD, SURFBOARD, OR SKATEBOARD

[75] Inventors: Alain Grenetier, Annecy; Philippe Renard, La Balme de Sillingy; Valerie Rochet, Meythet, all of France

[73] Assignee: Salomon S.A., Metz-Tessy, France

[21] Appl. No.: 749,331

[22] Filed: Nov. 14, 1996

[30] Foreign Application Priority Data

Nov. 15, 1995 [FR] France .................................. 95 13758

[51] Int. Cl.[6] .............................. B32B 31/12; B32B 7/12

[52] U.S. Cl. ...................... 156/235; 156/277; 156/306.6; 428/196; 428/200; 428/209; 280/610

[58] Field of Search .................................... 156/235, 240, 156/306.6, 277; 280/610; 428/209, 457, 537.1, 317.1, 339, 200, 196

[56] References Cited

U.S. PATENT DOCUMENTS

| | | | |
|---|---|---|---|
| 3,816,573 | 6/1974 | Hashimoto et al. | 280/610 X |
| 4,382,610 | 5/1983 | Arnsteiner | 280/610 |
| 4,462,852 | 7/1984 | Custor | 156/231 |
| 4,997,506 | 3/1991 | Recher et al. | 156/235 |
| 5,032,139 | 7/1991 | Recher et al. | 8/471 |
| 5,056,807 | 10/1991 | Comert et al. | 280/610 |
| 5,183,618 | 2/1993 | Pascal et al. | 280/610 X |
| 5,437,755 | 8/1995 | Lavorel et al. | 156/240 |
| 5,544,908 | 8/1996 | Fezio | 280/610 |

FOREIGN PATENT DOCUMENTS

| | | | |
|---|---|---|---|
| 381865 | 12/1986 | Austria . | |
| 0606556 | 7/1994 | European Pat. Off. . | |
| 0641575 | 3/1995 | European Pat. Off. . | |
| 2620974 | 3/1989 | France . | |
| 2620975 | 3/1989 | France . | |
| 2660251 | 10/1991 | France . | |
| 2 697 440 | 5/1994 | France | 280/610 |
| 2729337 | 7/1996 | France . | |

*Primary Examiner*—Curtis Mayes

*Attorney, Agent, or Firm*—Greenblum & Bernstein, P.L.C.

[57] ABSTRACT

The invention relates to a process for decorating a composite article including the preparation of a decorated complex to be assembled with a reinforcement structure of the article made of a resin, that is capable of flowing when heated, during a subsequent cycle of hot pressing, wherein it includes a first cycle, during which the transfer of a decoration is undertaken using the method for imprinting sublimate ink(s) on the first surface of a layer made of a transparent or translucent plastic material; and a second cycle during which one undertakes, by means of an adhesion film, the hot or press assembly, on the first surface thus decorated, of a contrast sheet made out of a material selected from the group constituted by the non-anodized aluminum, the synthetic dry fiber, wood. The invention enables the decorative patterns to be developed by means of varied and very attractive backgrounds effects, such as woven, metallized or grained backgrounds, depending upon the type of contrast sheet used.

23 Claims, 1 Drawing Sheet

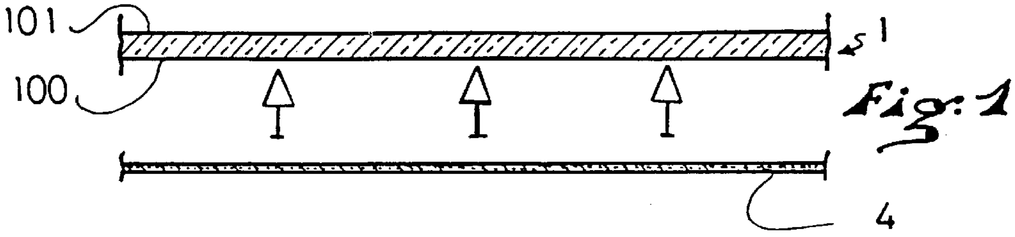
Fig: 1
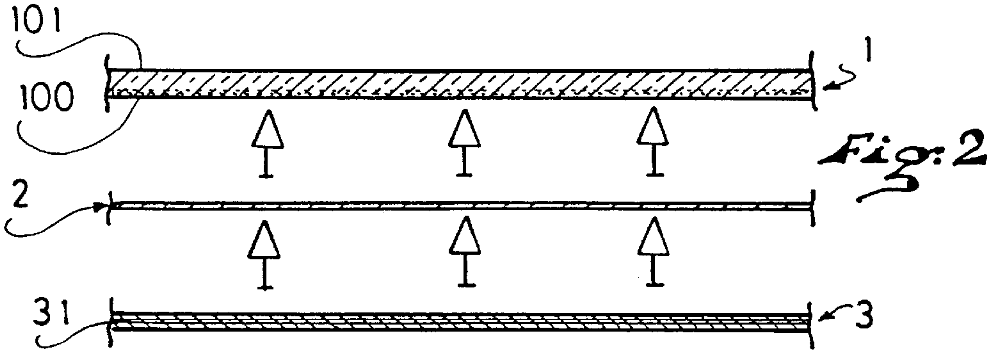
Fig: 2
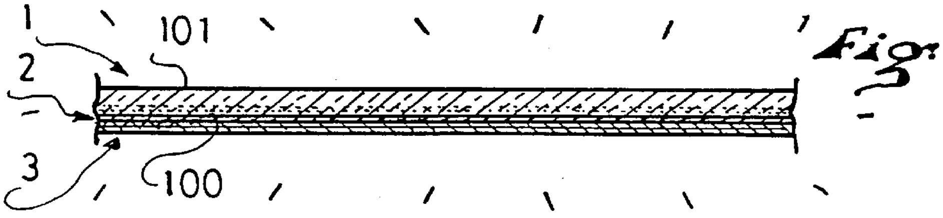
Fig: 3
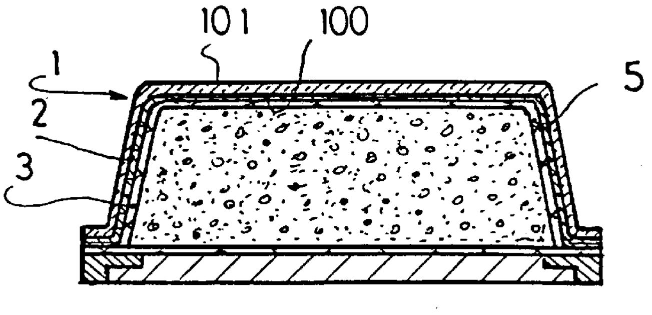
Fig: 4
Fig: 5
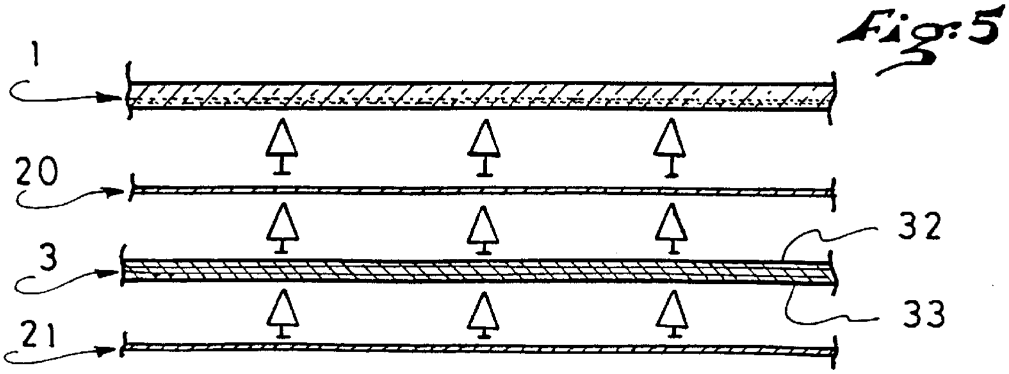

PROCESS FOR DECORATING A COMPOSITE ARTICLE SUCH AS A SKI, SNOWBOARD, SURFBOARD, OR SKATEBOARD

BACKGROUND OF THE INVENTION

1. Field of the Invention

The present invention relates to a new process for decorating a composite article. It relates more particularly to laminate-shaped articles that include various plastic and composite materials such as skis in general, surfboards, snowboards, skateboards or other similar objects.

2. Background and Material Information

Sublimation is a technique that is well-adapted for ski decoration, which makes it possible to use of a number of different plastic supports and to imprint any patterns without it being necessary to subject the support to a specific preliminary preparation operation. The principle of transfer consists of causing inks, contained in a base paper in the form of dried extracts, to evaporate by application of heat and pressure against the support to be decorated. The method is clean, fast, and without emanation of noxious vapors or solvents.

In most cases, the decoration is transferred on the external surface of a transparent layer covering the article to be decorated. An ink gradient is formed over several tenths of mm, from the external surface towards the inside of the transparent layer. The major drawback is that the decoration is directly exposed to external attacks and can deteriorate rapidly if the article is used under heavy conditions (when the article is exposed to shocks, scratches, substantial UV radiation, etc., for example).

An attempt has been made to find solutions to these problems, such as described in the Patent Application No. FR-A-2 620 974, for example, which is commonly owned and wherein it is proposed to obtain the sublimation through an opaque internal layer that is first affixed by extrusion to a transparent external layer. The dual layer thus decorated is then attached and affixed to the article.

The Patent Application No. FR-A-2 620 975, which is also commonly owned, distinguishes over the previous one in that the sublimation is first carried out on an opaque single layer sheet which is then assembled by adhesion on a protective transparent single layer sheet. The assembly is then attached on the article by heat adhesion.

In these two cases, the migration of the inks occurs through the opaque layer, which creates a loss in the final definition of the decoration. Even if the migration front where ink is more concentrated, appears, a pastellization of this decor is obtained due to the vertical diffusion of inks through the opaque layer.

Other solutions have been tried, such as obtaining sublimation through the internal surface of the protective transparent layer, for example.

The transparent layer thus decorated is assembled with an opaque layer. The assembly is then affixed on the composite article by heat adhesion. In this case, the increase in the temperature during the adhesion restarts the migration of the inks which are then diffused in the opaque layer. The deep diffusion creates the aforementioned problem of pastellization, with which a substantial lateral diffusion is associated in view of a hot flow of the opaque layer, which lessens the sharpness of the decoration.

The applicant has provided a satisfactory solution to this problem of ink migration that is addressed in the nonpublished French Application No. 95 00684. It consists of covering the sublimed transparent layer with a transparent coating made out of a cross-linkable material, and then hardening the coating by cross-linking to increase its resistance to creeping and its thermal stability. This process does not have advantages only.

In particular, the layer of cross-linkable material is preferably selected from among varnishes. It is also necessary to apply a layer of white or contrasted colored layer of lacquer on top of the cross-linking material.

These products contain highly volatile, inflammable and often harmful solvents or thinners. Their application under safe conditions for the health of the operators, and for the environment in general, requires the use of specific means.

In additions it is necessary to respect the drying periods, or to use means that are adapted for a rapid crosslinking, such as UV radiation, for example. Most of the time, it is also necessary to carry out these surface treatments to improve the adhesion between the various layers.

Also in a general manner, in view of the presence of a plastic contrast layer or of a lacquer, the background effects are not much varied, and they all result in a quite similar finish.

SUMMARY OF THE INVENTION

The object of the present application is to provide a solution to the aforementioned problems.

In particular, one of the objects is to propose a more ecological solution for decoration by internal sublimation by avoiding the use of materials such as solvents, thinners and other products of the same type.

Another object of the invention is additionally to develop the decoration patterns by means of very diversified and attractive material effects, such as an effect of a metallic, woven background, etc., for example.

To this end, the invention relates to a process for is decorating a composite article including the preparation of a decorated complex to be assembled with a reinforcement structure of the article made of a resin, that is capable of flowing when heated, during a subsequent cycle of hot pressing. It includes:

- a first cycle, during which the transfer of a decoration is undertaken using the method for imprinting sublimable ink (s) on the first surface of a layer made of a transparent or translucent plastic material;
- a second cycle during which one undertakes, by means of an adhesion film, the hot or press assembly, on the first surface thus decorated, of a contrast sheet made out of a material selected from the group constituted by the non-anodized aluminum, the dry synthetic fiber, wood.

The sublimation inks cannot migrate in the various materials during the final cycle. Thus, the decoration remains sharp and maintains its original colors. These various materials also make it possible to obtain particularly dramatic and varied background effects.

According to a characteristic of the invention, the contrast sheet is a non-anodized aluminum sheet covered on each surface with a film of a ionomer-type olefin copolymer. The film serves as an adhesion interface and renders the aluminum compatible, during adhesion, with most of the substrates with which it is adapted to adhere. It also serves as a protection against the oxidation of the aluminum sheet is during the storage thereof.

According to another characteristic, one undertakes the lining of a barrier film on the surface of the contrast sheet made of a material having natural or synthetic dried fibers, which is adapted to enter into contact with the resin, that can flow when heated, of the reinforcement structure of the article, the barrier film being thus made of a material having a good compatibility of adhesion with the contrast sheet, on the one hand, and with the resin that can flow when heated, on the other hand. One thus keeps the resin of the reinforcement structure from crossing or impregnating the contrast sheet, and therefore from creating externally visible aesthetic defects (bubble phenomena, stains, etc.).

According to a characteristic related to the preceding, the lining of the barrier film is accomplished by taking advantage of the heat and pressure applied during the second cycle for assembling the contrast sheet on the layer of plastic material.

In an alternative solution, one can also provide that the lining of the barrier film occurs during the final assembly of the decorated complex with the reinforcement structure of the article during a subsequent cycle of hot pressing.

The invention is also related to the decoration complex adapted to be assembled with a reinforcement structure made of resin, that can flow when heated, of a composite article.

BRIEF DESCRIPTION OF DRAWINGS

Other characteristics and advantages will become apparent from the description that follows, with reference to the annexed figures which are only provided by way of non-limiting examples, and in which:

FIG. 1 shows the first cycle of transfer by sublimation according to the process of the invention;

FIGS. 2 and 3 show the second cycle of heat and press assembly according to the process of the invention;

FIG. 4 schematically shows a cross-sectional view of a ski covered with the complex of the invention; and FIG. 5 is a view similar to FIG. 2 according to a variation of the invention.

DETAILED DESCRIPTION OF THE PREFERRED EMBODIMENTS

The process according to the invention first requires the use of a single layer plastic sheet 1 made out of a transparent or translucent material; this sheet is referred to as "transparent layer" in the following description.

During a first step, one undertakes the printing of a decoration by transfer of sublimable dyes on a surface 100 of the layer. This surface 100 is adapted to constitute the inner side of the transparent layer in the complex, as opposed to the surface 101 which is the outer side. The decoration pattern to be printed is contained, in a known manner, in a sheet of base paper 4 which is applied under a pressure P at a temperature T during a time t against the surface 100 of the transparent layer. The transparent layer can be selected from among the sublimable plastic materials such as the Polyamides, PA11, PA12, PA6.3, PA6.6, etc., the polycarbonates, the ABS (Acrylonitrile Butadiene Styrene), the transparent AS (Acrylonitrile Styrene) mixed with a TPU (Elastomer thermoplastic urethane), the Polyethylenes Terephthalates (PET).

The thickness of the transparent layer is comprised between 0.2 and 1.1 mm. The sublimation is carried out at a temperature comprised between 160° and 180° C., a pressure of 1–2 bars during a time comprised between approximately 1 mn 30 sec. and 4 mn. The depth of the migration front of the inks through the transparent layer on the outer side is on the order of, or slightly greater than, 0.20 mm.

During a second step, this transparent layer 1 is brought close together with a solid adhesive film 2 and a contrast layer 3. The adhesive film 2 is brought into contact with the pre-decorated surface 100 and the contrast layer 3 is brought into contact with the adhesive film (FIG. 2).

One then undertakes the pressing phase itself by increasing the pressure and the temperature to at least the softening point of the film, in order to obtain the adhesive of the transparent layer 1 with the contrast layer 3.

In the example illustrated, the contrast layer is a thin non-anodized film of aluminum 31 covered on each surface with a film of ionomer-type olefine copolymer (commercial name SURLYN®).

The thickness of the aluminum sheet is comprised between 15 and 60 $\mu$m and the thickness of each film is comprised between 10 and 50 $\mu$m.

The adhesive film 2 is selected for its capability of adherence with the transparent layer 1 and with the contrast layer 3. This is a thin hot melt film with a thickness comprised between a few microns and a few tenths of millimeters.

one can advantageously use a film 2 made of polymer or copolymer grafted by action of carboxylic acid or of a carboxylic acid anhydride, for example, by acrylic acid, by methacrylic acid, or by maleic anhydride.

Such a film 2 can especially be made of grafted polyethylene, for example, made of polyethylene grafted by maleic anhydride.

This type of film enables the adhesive of most of the aforementioned sublimable materials constituting the transparent layer 1 with the contrast layer made of ionomer treated aluminum.

But the film 2 can also be constituted by an ethylene-vinyl acetate copolymer (EVA), grafted by the action of carboxylic acid or a carboxylic acid anhydride.

By way of example, the use of a film 2 made of a maleic anhydride grafted polyethylene enables the adhesive of a first element 1 made of polyamide on a contrast layer 3 made of ionomer treated aluminum. According to the invention, one causes the adhesive of the film 2 on the first element 1 by chemical reaction between the groups of maleic anhydride grafted to the surface of the polyethylene and the terminal groups of the polyamide. These groupings exist in a low concentration in the material, but they have the particularity of migrating to the extreme surface during the extrusion of the sheet of polyamide, and are therefore available for the reaction. The reaction leads to the replacement of the oxygen atom of the maleic cycle by the nitrogen atom of the amine terminal group of the polyamide, and to the formation of a water molecule. It is necessary to bring the substrates to temperatures above 110° C. to initiate the reaction. Therefore, the film 2 must be hot pressed against the first element 1, by calendering or pressing, to ensure their affixation to one another.

In the example shown, the assembly of the various layers 1, 2, 3 is undertaken within the scope of a single heating and pressurizing cycle.

Of course, it can be envisioned to first apply the film 2 on one of the layers 1 or 3, and then to apply the film 2 to the second layer.

The complex thus formed is then ready for use as a coating for a composite article to be decorated.

By composite article is essentially meant any laminated object having a reinforcement structure, especially skis, snowboards, skateboards, etc.

FIG. 4 schematically shows the cross-section of a ski which has a complex obtained according to the process of the invention.

The affixation of the complex to the remainder of the ski structure can be done with respect to very different processes. In any event, one generally undertakes a hot pressing cycle of the decorated complex with the outer surface of the reinforced or reinforcement structure 5 of the ski made of a resin that can flow when heated. This reinforcement structure 5 can especially be constituted by a textile reinforcement web pre-impregnated with a thermohardenable resin or with a thermoplastic resin.

In particular, one can use a textile reinforcement web made of woven or non-woven glass fibers, of carbon or polyaramid, impregnated with a humid or partially cross-linked thermohardenable resin selected from the group constituted by polyester, epoxies, polyurethanes.

Alternatively, one can use a textile reinforcement web made of woven or non-woven glass fibers, or of carbon impregnated with a thermoplastic resin selected from the group constituted by polyamides, polycarbonates, PEI (Polyether Imide).

More generally, the contrast sheet 3 can be selected from the group constituted by non-anodized aluminum, synthetic dried fiber and wood.

Depending upon the selection, one can obtain a predetermined appearance, namely, a finish with metallized colors in the case of aluminum, or a woven background in the case of fiber, or yet a grained aspect in the case of wood.

When the contrast sheet is made of dried fibers, it advantageously has the shape of a woven or non-woven textile web (or haze) made of glass fibers, carbon, polyester, polyaramid or other natural or synthetic fibers, such as cotton, for example.

In order to avoid any pollution of the dried fiber of the contrast sheet 3 by the resin, that can flow when heated, of the reinforcement structure of the composite article to be decorated, it is necessary to make the external surface 33 impervious by means of a barrier film 21 (FIG. 5).

To this end, during the second cycle for hot pressing the pre-sublimed transparent layer 1 to the contrast sheet 3, by means of the adhesive film 20, one then attaches an additional barrier film 21 on the external surface 33 and allows it to adhere thereon, as opposed to the internal surface 32 in contact with the film 20. The adhesive film 20 plays an important role of a buffer for the sublimation inks which have a tendency to naturally migrate in the layer of dried fiber 3. The barrier film 21 is made of a material having a good compatibility of adhesive with the contrast sheet 3, on the one hand, and with the resin, that can flow when heated, of the reinforcement structure of the composite article to be decorated, on the other hand.

In a variation, the lining of the barrier film can also be carried out during the final assembly of the complex with the reinforcement structure of the article to be decorated during the subsequent hot pressing cycle.

The barrier film 21 can be constituted by a material that is cable of flowing when heated, such as an ionomer material, preferably dyed in the mass to improve the contrast of the sheet 3. The barrier film is selected from a material whose viscosity is such that it penetrates within the gaps of the fiber and clogs them.

Another advantage of the dried fiber resides in its ability to avoid the lateral flow of the adhesive film 20. During the hot assembly cycle, the fiber absorbs a portion of the melting thermoplastic material by reason of its porosity.

By way of example, the utilization of an ionomer barrier film enables the adhesive of a contrast sheet selected from among the aforementioned materials with the reinforcement structure made of an epoxy-type resin that can flow when heated.

The present invention is not limited to the embodiments which have explicitly been described, but it encompasses the various alternatives and generalizations that fall within the scope of the following claims.

What is claimed:

1. Process for decorating a composite article including the preparation of a decorated complex to be assembled with a reinforcement structure of the article made of a resin, that is capable of flowing when heated, during a subsequent cycle or hot pressing, wherein it includes:

a first step, during which the transfer of a decoration is undertaken using the method for imprinting sublimable ink(s) on the first surface of a layer made of a transparent or translucent plastic material;

a second step during which one undertakes, by means of an adhesive film, the hot or press assembly, on the first surface thus decorated, of a contrast sheet made out of a material selected from the group consisting of non-anodized aluminum, dry natural or synthetic fiber, and wood.

2. A process for decorating a reinforcement structure of a composite article with a decorated complex adapted to be assembled with the reinforcement structure, said process comprising:

transferring a decoration to a first surface of a layer of transparent or translucent plastic material by sublimable ink imprinting, thereby forming a decorated surface;

assembling a contrast sheet to the decorated surface with an adhesive film and applying heat and pressure, the contrast sheet comprising a material selected from the group consisting of non-anodized aluminum, dry natural or synthetic fiber, and wood, thereby forming a decoration complex; and affixing the decoration complex to an outer surface of a reinforcement structure.

3. A process according to claim 2, wherein:

the contrast sheet is a non-anodized aluminum sheet covered on earth surface with a film of an olefin copolymer ionomer.

4. A process according to claim 2, wherein the contrast sheet is made of a dry natural or synthetic fiber and the outer surface of the reinforcing structure is made of a resin, the resin being flowable when heated, the process further comprising:

lining an external surface of the contrast sheet, adapted to contact the outer surface of the reinforcement structure during said affixing of the decoration complex to the outer surface of the reinforcement structure, with a barrier film;

the barrier film comprising a material having good adhesive compatibility with the external surface of the contrast sheet and with the resin of the outer surface of the reinforced structure.

5. A process according to claim 4, wherein:

said lining an external surface of the contrast sheet with a barrier film is performed by means of said heat and pressure applied during said assembling of the contrast sheet to the decorated surface.

6. A process according to claim 5, wherein:

said contrast sheet comprises a woven or non-woven textile web, said web comprising a member selected from the group consisting of glass fibers, carbon, polyester, polyaramid, and cotton.

7. A process according to claim 4, wherein:

said lining an external surface of the contrast sheet with a barrier film is performed during a final assembly of the decorated complex with the reinforcment structure during a subsequent application of heat and pressure.

8. A process according to claim 7, wherein:

said contrast sheet comprises a woven or non-woven textile web, said web comprising a member selected from the group consisting of glass fibers, carbon, polyester, polyaramid, and cotton.

9. A process according to claim 4, wherein:

said contrast sheet comprises a woven or non-woven textile web, said web comprising a member selected from the group consisting of glass fibers, carbon, polyester, polyaramid, and cotton.

10. A process according to claim 4, wherein:

said contrast sheet comprises a woven or non-woven textile web, said web including synthetic fibers.

11. A process according to claim 4, wherein:

said contrast sheet comprises a woven or non-woven textile web, said web including natural fibers.

12. A process according to claim 2, wherein:

said contrast sheet comprises non-anodized aluminum and has a thickness between 15 and 60 $\mu$m.

13. A process according to claim 12, wherein:

said contrast sheet is covered on each surface with a film of olefin copolymer ionomer.

14. A process according to claim 13, wherein:

each film of olefin copolymer ionomer has a thickness between 10 and 50 $\mu$m.

15. A decoration complex adapted to be affixed to an outer surface of a reinforcement structure of a composite article, the outer surface of the reinforcement structure being comprised of a resin, the resin being made of a material that can flow when heated, said decoration complex comprising:

a layer of transparent or translucent plastic material having an internal surface bearing an ink decoration imprinted by sublimation of the ink;

a contrast sheet affixed to said internal surface of said layer of plastic material with an adhesive film;

said contrast sheet comprising a member selected from the group consisting of non-anodized aluminum, dry natural or synthetic fiber, and wood; and said contrast sheet providing color for said decoration to render an appearance comprising a member selected from the group consisting of metallic, woven, and grained.

16. A decoration complex according to claim 15, wherein:

said contrast sheet comprises a woven or non-woven textile web, said web comprising a member selected from the group consisting of glass fibers, carbon, polyester, polyaramid.

17. A decoration complex according to claim 15, wherein:

said contrast sheet comprises a woven or non-woven textile web, said web including synthetic fibers.

18. A decoration complex according to claim 15, wherein:

said contrast sheet comprises a woven or non-woven textile web, said web including natural fibers.

19. A composite article comprising:

a reinforcement structure having an outer surface, said outer surface comprising a resin, said resin being made of a material that can flow when heated; and a decoration complex affixed to said outer surface of said reinforcment structure, said decoration complex comprising:

a layer of transparent or translucent plastic material having an internal surface bearing an ink decoration imprinted by sublimation of the ink;

a contrast sheet affixed to said internal surface of said layer of plastic material with an adhesive film;

said contrast sheet comprising a member selected from the group consisting of non-anodized aluminum, dry natural or synthetic fiber, and wood; and said contrast sheet providing color for said decoration to render an appearance comprising a member selected from the group consisting of metallic, woven, and grained.

20. A composite article according to claim 19, wherein:

said contrast sheet comprises a woven or non-woven textile web, said web comprising a member selected from the group consisting of glass fibers, carbon, polyester, polyaramid.

21. A composite article according to claim 19, wherein:

said contrast sheet comprises a woven or non-woven textile web, said web including synthetic fibers.

22. A composite article according to claim 19, wherein:

said contrast sheet comprises a woven or non-woven textile web, said web including natural fibers.

23. A composite article according to claim 19, wherein said composite article is a ski or a snowboard.

* * * * *